United States Patent [19]

Suzuki et al.

[11] Patent Number: 5,856,663
[45] Date of Patent: Jan. 5, 1999

[54] FOCUS DETECTING APPARATUS WITH VIRTUAL CENTERING OF LINE SENSOR

[75] Inventors: Shinichi Suzuki; Masahiro Nakata, both of Tokyo, Japan

[73] Assignee: Asahi Kogaku Kogyo Kabushiki Kaisha, Tokyo, Japan

[21] Appl. No.: 819,137

[22] Filed: Mar. 17, 1997

[30] Foreign Application Priority Data

Mar. 15, 1996 [JP] Japan .................................. 8-059831

[51] Int. Cl.$^6$ ...................................................... G01J 1/20
[52] U.S. Cl. ............................ 250/201.2; 356/11; 396/94
[58] Field of Search .............................. 250/201.2, 201.4, 250/201.7; 356/11, 4.04; 396/79, 80, 94, 111, 121

[56] References Cited

U.S. PATENT DOCUMENTS

| | | | |
|---|---|---|---|
| 4,394,569 | 7/1983 | Nakamura | 250/204 |
| 4,485,303 | 11/1984 | Suzuki | 250/201.2 |
| 4,491,402 | 1/1985 | Suzuki | 250/204 |
| 5,266,982 | 11/1993 | Soshi | . |
| 5,483,318 | 1/1996 | Hamada et al. | 396/121 |
| 5,530,514 | 6/1996 | Lisson et al. | 396/128 |
| 5,664,236 | 9/1997 | Utagawa | 396/128 |

FOREIGN PATENT DOCUMENTS 7159160  6/1995  Japan .

*Primary Examiner*—Que Le
*Attorney, Agent, or Firm*—Greenblum & Bernstein, P.L.C.

[57] ABSTRACT

A focus detecting apparatus includes a focus detecting device which forms an image through a telephotographic system, onto a line sensor, and which detects a focus state of the telephotographic system based on an output from a predetermined portion of the line sensor. An assigning device which assigns the pixels to be used in detecting the focusing state in the case where the actual center of the line sensor deviates from the reference position of the telephotographic system.

11 Claims, 13 Drawing Sheets

FOCUS DETECTING APPARATUS WITH VIRTUAL CENTERING OF LINE SENSOR

BACKGROUND OF THE INVENTION

1. Field of the Invention

The present invention relates to a focus detecting apparatus which can be applied to an auto-level, a theodolite or a transit instrument etc., having a telephotographic system.

2. Description of the Related Art

A surveying instrument, such as an auto-level, a theodolite or a transit instrument etc., is provided with a collimating telescope, a level, and scales for measuring a rotative angle and/or an elevational angle. The collimating telescope is first horizontally set and is then adjusted horizontally and vertically, so that an operator may observe a collimation point or object.

A typical surveying instrument having a collimating telescope is provided, in order from the object side, with an objective lens, a focusing lens and an eyepiece. The position of the focusing lens is adjusted according to the distance from the object, so that an image of the object may be formed on a focusing plate (reticle). The operator may thus observe, via the eyepiece the image superimposed on the reticle.

Some types of surveying instruments are provided with a so-called passive type of automatic focusing apparatus. As is well known, the focusing of the automatic focusing apparatus is performed in the following manner. First, an optical path of the optical system of the collimating telescope is split into two. Then one of the split optical paths is further split into two at a focus detecting sensor provided along the split optical path. An object image is formed on a pair of line sensors positioned at a point equivalent to that of the focusing plate (reticle). Defocus is detected according to the phase difference of the object images on the pair of line sensors, and focusing is performed.

Generally, since a surveying instrument is used in conjunction with a staff positioned at the center of the visual field, it is desirable that the object image used to detect the defocus has a center portion at an intersection point of the reticle. However, when the described focus detecting sensor is provided to the surveying instrument, the center of the focus detecting sensors may deviate due to errors in mounting or in manufacturing. The deviation of the defocus detecting portion from the center may result in the formation of an image portion which is not properly positioned with respect to the reticle. The focus detecting sensor may be moved slightly in order to facilitate centering, but such a movement is difficult to enable both in structure and in operation.

The surveying instrument normally utilizes a staff as the aiming object. Accordingly, the size (width) of the staff image on an object forming (focusing) plate decreases as the distance increases, as shown in FIGS. 8 and 9. Consequently, the focal point may be detected with respect to an image near the staff image. The width of the focus detecting portion may narrow in the case of a long distance, but when the width of the focus detecting portion is narrowed in the aforementioned case of deviation from the center, it is impossible to detect the focusing state of a thin object image positioned at the center of the visual field.

SUMMARY OF THE INVENTION

It is an object of the present invention to provide a focus detecting apparatus, in which it is possible to easily coincide the center of the focus detecting portion with the center of the visual field.

To achieve the object mentioned above, according to the present invention, a focus detecting device is provided which forms an image through a telephotographic system, onto a line sensor, and which detects a focus state of said telephotographic system based on an output from a predetermined portion of said line sensor. An assigning device is also provided to assign the pixels to be used in detecting the focusing state.

The focus detecting apparatus further comprises a focus detecting device which forms images of a divided luminous flux from a telephotographic system based on an output of the line sensor, and a device for assigning pixels to be used in detecting the focusing state.

The focus detecting apparatus further comprises a calculation device which calculates a defocus amount based on the output of the focus detecting portion of the line sensor. This output corresponds to a pair of images, of which the light is received and output by a pair of line sensors.

The assigning device assigns the pixels to be used in detecting the focusing state in the case that the actual center of the line sensor deviates from the reference position of the telephotographic system.

The focus detecting apparatus is preferably incorporated in a surveying instrument.

Preferably the telephotographic system further comprises an objective lens group, a focusing lens group which adjusts the focus state by moving along an optical axis, a focusing plate having a reticle, an eyepiece lens group for observing an object image formed on the focusing plate, and a beam splitter optical system positioned between the focusing lens group and the focusing plate. Line sensors comprising multiple light receiving devices are positioned horizontally along a light path split by the beam splitter optical system, with the focusing plate reticle designated as the center.

The focus detecting apparatus further comprises a memory device which stores assigning data of an area of the output of the line sensor used during a telephotographic system focusing state detection.

Assigning data are read in the memory device when the focus detecting device detects a focus state.

The present disclosure relates to subject matter contained in Japanese Patent Application No. 08-59831 (filed on Mar. 15, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
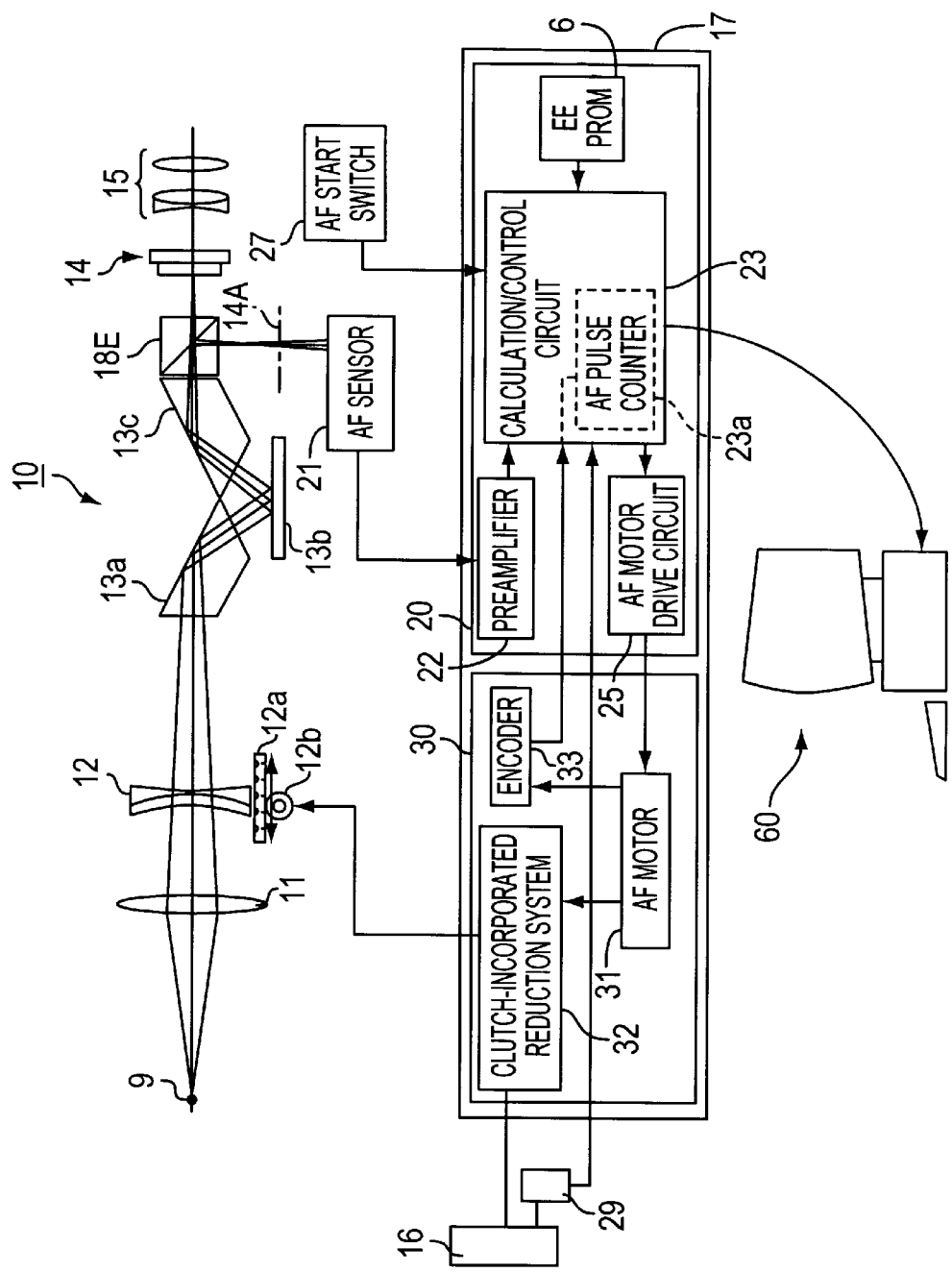
FIG. 1 is a block diagram of main elements of an embodiment of an auto-level to which the present invention is applied.

FIG. 1 shows an automatic focusing apparatus according to an embodiment of the present invention. An auto-level 10 consists of a collimating objective lens group 11 of positive power, a focusing lens group 12 of negative power, an optical horizontal compensation system 13 (13a, 13b, 13c), a focusing plate (which defines a focal plane) 14, and a positive eyepiece 15, in this order from the object side (left side of FIG. 1).

The optical horizontal compensation system 13, per se known, consists of a first compensation prism 13a, a compensation mirror 13b, and a second compensation prism 13c, and has a symmetrical shape. The optical horizontal compensation system 13 is hung from a shaft by a string (not shown). The angle defined between the compensation mirror 13b and the first compensation prism 13a is identical in absolute value but opposite in direction to the angle defined between the compensation mirror 13b and the second compensation prism 13c. The angle, for example 30°, varies depending on the length of the string, etc. When the optical horizontal compensation system 13 is set so that the optical axes of the objective lens group 11 and the focusing lens group 12 are substantially parallel (inclined at, for example, about 10 to 15 minutes with respect to the horizontal axis), light incident upon the first compensation prism 13a deviates from the horizontal direction by the same amount. However, the light reflected by and emitted from the first compensation prism 13a, the compensation mirror 13b and the second compensation mirror 13c, is substantially collimated.

The focusing lens group 12 is provided, as a lens moving means, with a rack 12a secured beneath the focus lens group 12. The rack 12a engages a pinion 12b. When the pinion 12b rotates to move the focusing lens group 12 in the optical axis direction, the image of an object (e.g., a surveying staff) 9 formed by the objective lens group 11 and the focusing lens group 12 is translated along the optical axis. The operator views the object image formed on the focusing plate 14 (together with the reticle etc., drawn on the focusing plate 14) through the eyepiece 15.

A beam splitter (half mirror) 18 for splitting the light (or light path) is provided in the light path between the objective lens group 11 and the focusing plate 14. A focus detecting system (focus detector) 20 is provided in the split light path to detect the focus state (state of the formed image) at a surface 14A. The surface 14A is at a position optically equivalent to the focusing plate 14. The focusing lens 12 is driven by a lens driver 30 in accordance with the output of the focus detector 20. The main components of the focus detector 20 and the focusing lens group driver 30 are fixed on a substrate 17.

A calculation/control circuit 23 drives an AF motor 31 through an AF motor drive circuit 25, in accordance with the rotational direction of the AF motor 31 and the number of AF Pulses. The calculation/control circuit 23 includes RAM for holding calculation data. The rotation of the AF motor 31 is transmitted to the pinion 12b through a clutch incorporating reduction gear 32 to move the focusing lens group 12 (see FIG. 1). The calculation/control circuit is connected to an EEPROM 6 for storing an adjusting amount, i.e., assignment data.

The rotation of the AF motor 31 is detected and counted by the calculation/control circuit 23 in accordance with pulses output from an encoder 33. Thus, driving or stopping is controlled in accordance with the counted value and the pulse numbers previously calculated. The focus detector 20 and the focusing lens group drive system (i.e.,the lens driver) 30 moves the focusing lens group 12 in the optical axis direction in accordance with the object distance, to carry out the automatic focusing operation.

The focus detector 20 is provided with an AF start switch 27 which is actuated to start the automatic focusing operation, and an AF switch 29, which detects the AF (autofocus) mode (that is, the mode which is not the manual focus mode). The AF start switch 27 is a momentary ON push button switch (that remains ON only while pressed by an operator and is automatically turned OFF when the operator releases the switch). The movement of the AF switch 29 is synchronized with the movement of a focusing operation knob 16 in the axial direction. That is, the AF switch 29 is turned OFF under the automatic focusing mode, e.g., namely when the focusing operation knob 16 is pressed or moved in the axial direction inward toward the device.

The pinion 12b is driven in either a manual focus mode, in which a manual focusing operation is carried out using a manual focusing operation knob 16, or in an autofocus (AF) mode in which an automatic focusing operation is carried out in accordance with the focus detector 20 and the focusing lens group drive system 30. That is, the focusing mode is switchable between the autofocus (AF) mode, in which the focusing lens group 12 is driven in accordance with the output of the focus detector 20, and the manual focus mode, in which the focusing lens group 12 is driven manually regardless of the output of the focus detector 20.

For instance, when the manual focusing operation knob 16, which constitutes a mode switching device, is moved in one direction along the optical axis, the manual mode is obtained, and when the manual focusing operation knob 16 is moved in the opposite direction along the optical axis, the autofocus mode (AF mode) is obtained. The calculation/control circuit 23 detects whether the manual focusing operation knob 16 is switched to the autofocus mode when the AF switch 29 is turned ON.

Figure 2:
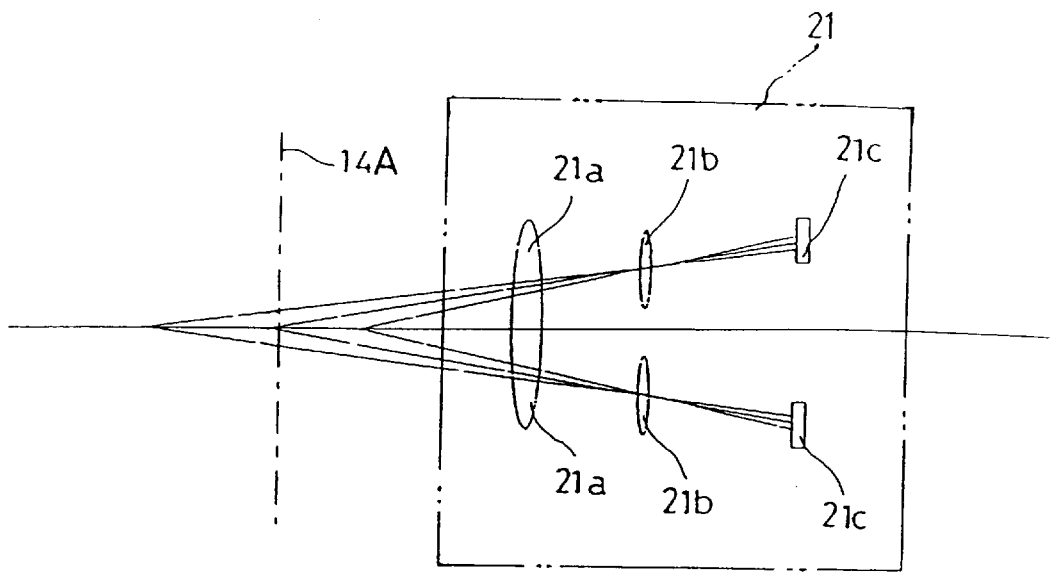
FIG. 2 is a schematic plan view of an embodiment of an AF sensor of an auto-level according to the present invention.

The focus detector 20 includes an AF sensor 21 located in the vicinity of the equivalent surface 14A, for detecting the defocus amount in accordance with the output of the AF sensor 21. In the illustrated embodiment in FIG. 2, a phase difference type AF sensor 21 is used. In the phase difference AF 21 sensor the object image on the equivalent surface 14A is split by a condenser lens (21a) and a pair of separator lenses (image forming lenses) 21b spaced at a distance identical to the base length, and is re-formed on a pair of CCD line sensors 21c. The position of the object image incident upon the pair of CCD line sensors 21c varies according to the focal points of the object 9. That is, the focal points correspond to positions when the image of the object 9 is accurately formed on the equivalent surface 14A (focused), when formed in front of the equivalent surface 14A (front focus), or when formed beyond the equivalent surface 14A (rear focus). The amount of deviation from the focal point (defocus amount) can be judged from the position of an object image formed on the pair of CCD line sensors 21c.

The pair of CCD line sensors 21c are provided symmetrically. One CCD line sensor 21c is shown schematically, in regard to the reference section thereof, in FIG. 3. Each of the line sensors 21c is provided with a number of photoelectric transducers (light receiving elements) which convert the object image received thereby into electric charges which are integrated (accumulated). The integrated charges are successively output as AF sensor data.

The pair of CCD line sensors 21c are positioned with respect to the reticle provided on the focusing plate 14 so, that the collimation axis of the reticle is positioned at the center between the CCS line sensors 21c (design center), and parallel to the horizontal line of the reticle. The horizontal line of the reticle is positioned at the verticle center of the CCS line sensors 21c.

Figure 7:
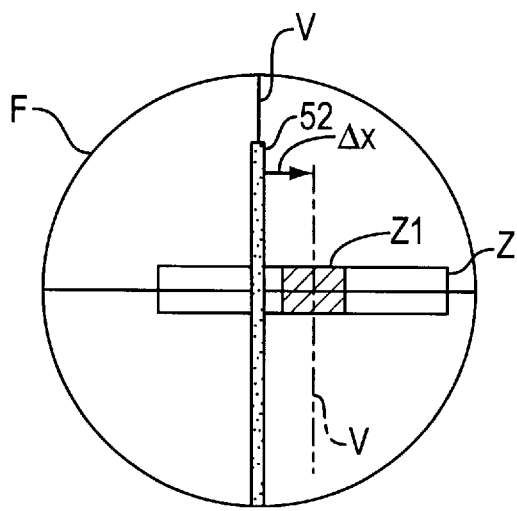
FIG. 7 is a schematic view of the relation of a focus detecting portion and a visual field during an adjustment of a focus detecting position of an auto-level according to the present invention.
Figure 8:
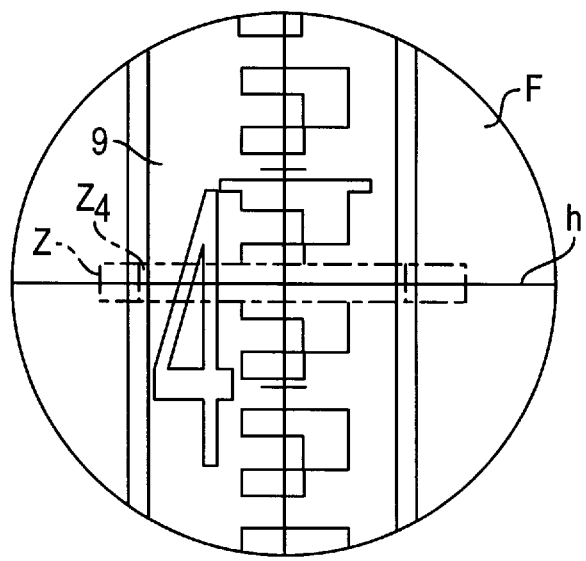
FIG. 8 is a schematic view of the relation of a surveying staff to a portion for detecting a distance measuring focal point, observed in the visual field at an object distance of 5 m.
Figure 9:
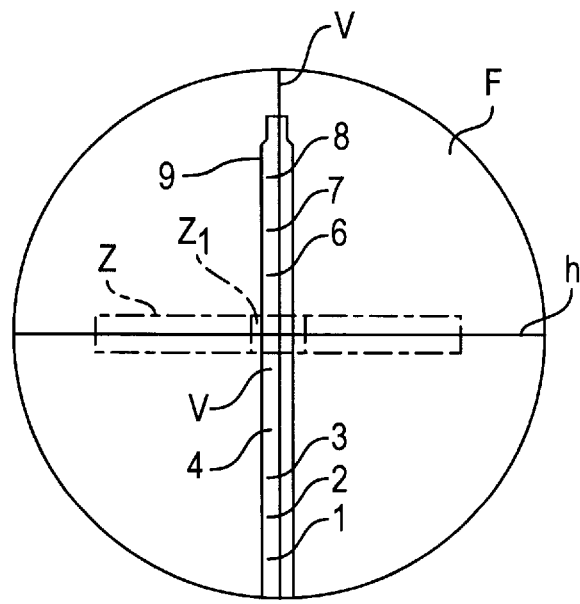
FIG. 9 is a schematic view of the relation of a surveying staff to a portion for detecting a distance measuring focal point, observed in the visual field at an object distance of 50 m.
Figure 10:
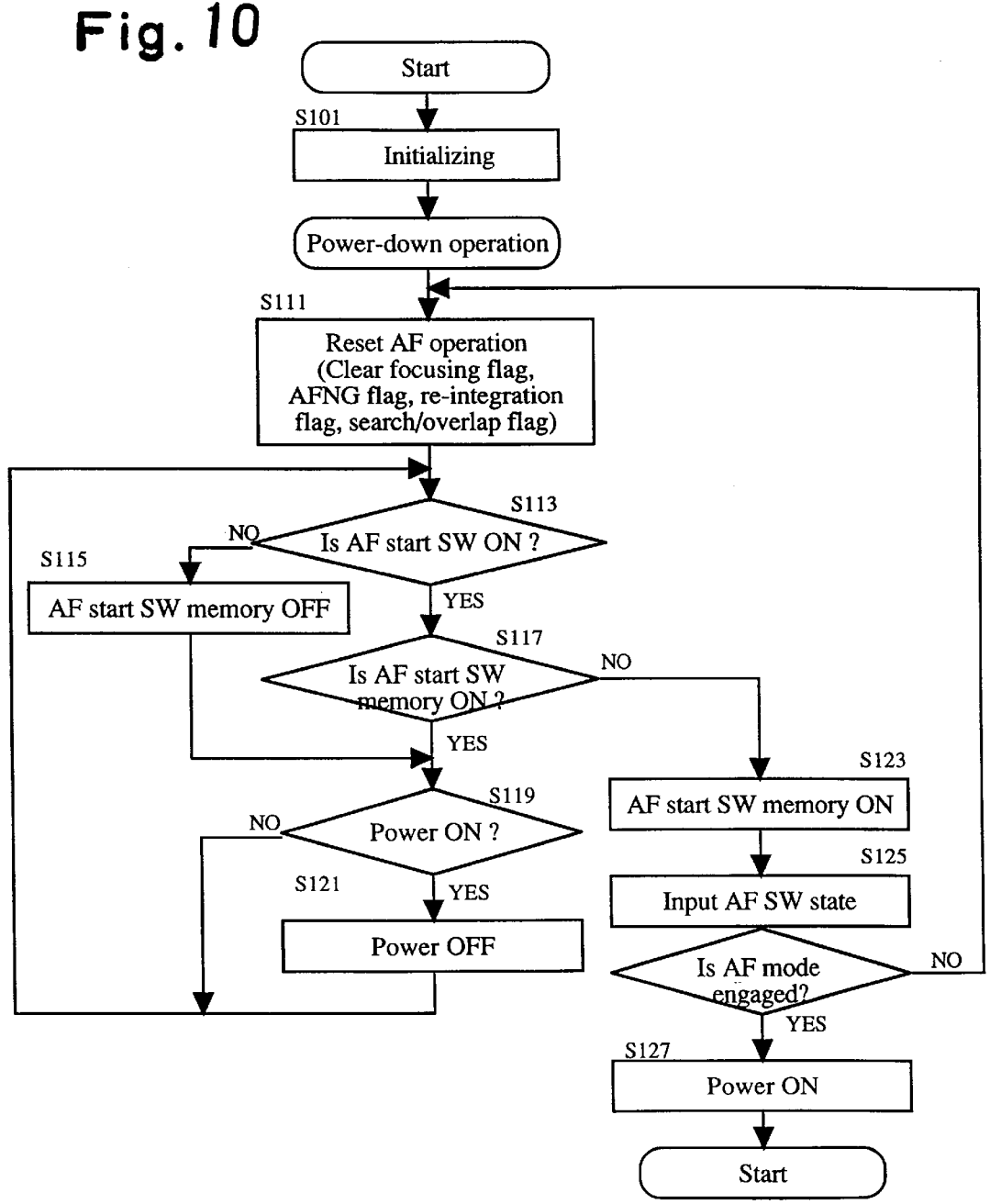
FIG. 10 is a flow chart showing a partial operation in an automatic focusing operation of an auto-level according to the present invention.
Figure 11:
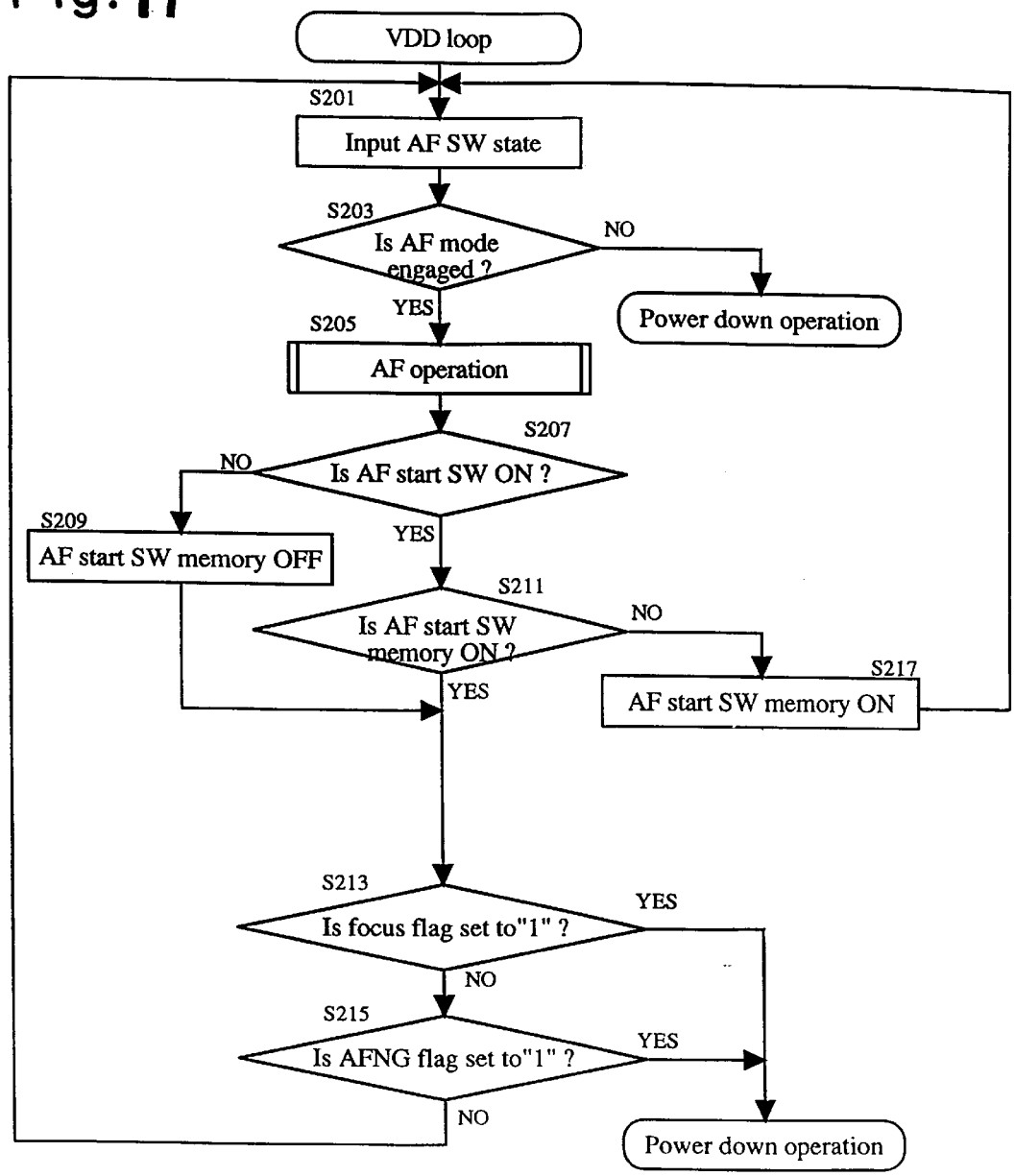
FIG. 11 is a flow chart showing a partial operation in an automatic focusing operation of an auto-level according to the present invention.
Figure 12:
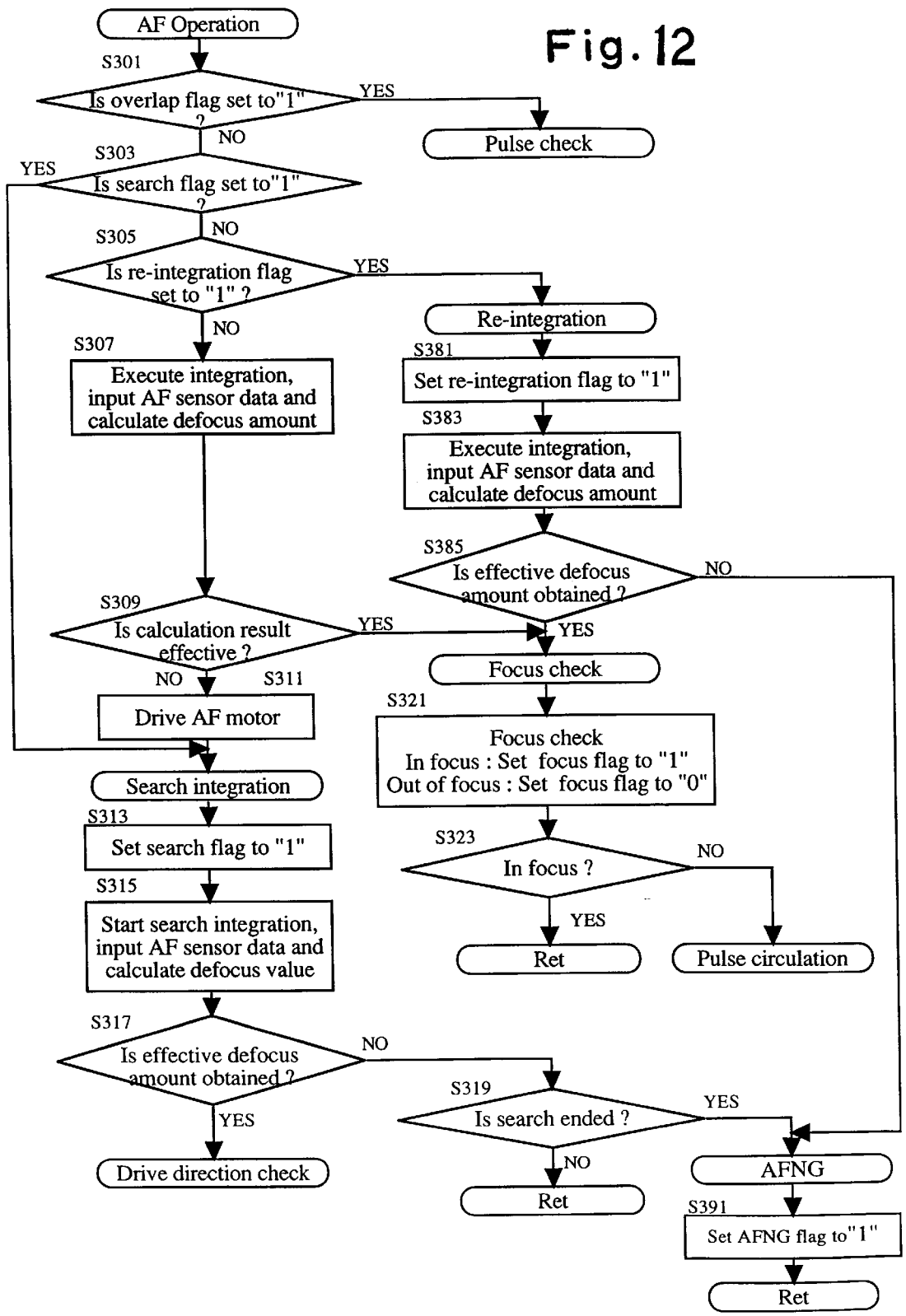
FIG. 12 is a flow chart showing a partial operation in an automatic focusing operation of an auto-level according to the present invention.
Figure 13:
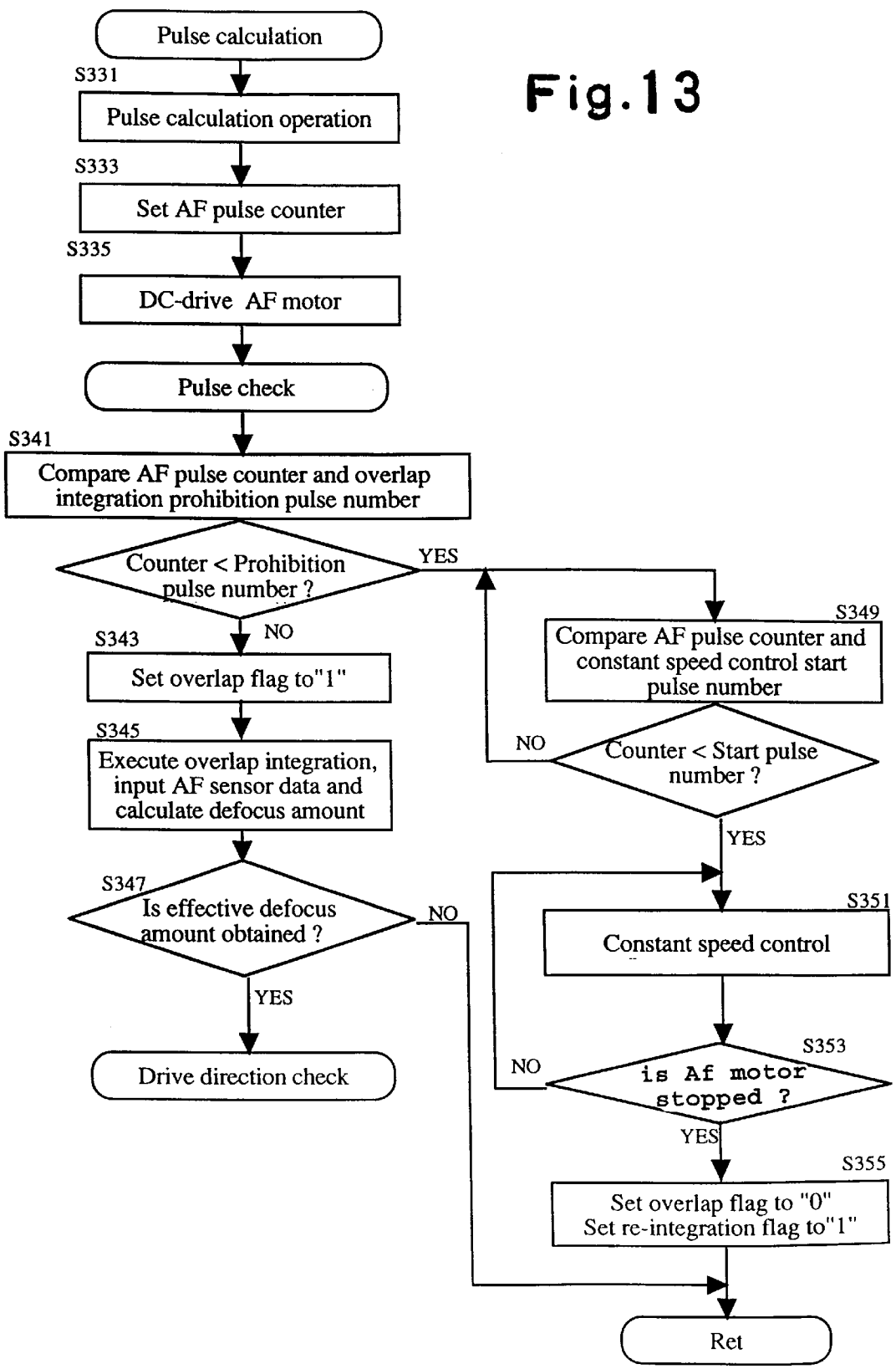
FIG. 13 is a flow chart showing a partial operation in an automatic focusing operation of an auto-level according to the present invention.
Figure 14:
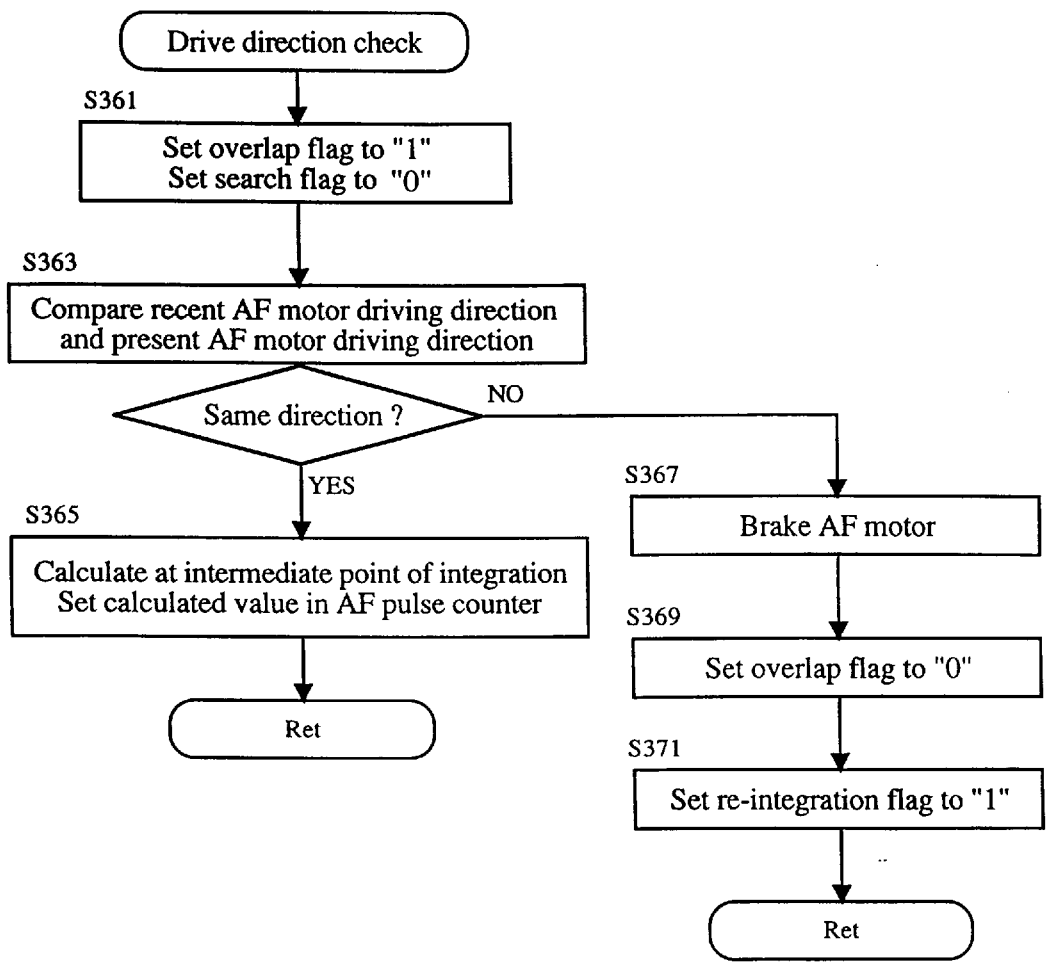
FIG. 14 is a flow chart showing a partial operation in an automatic focusing operation of an auto-level according to the present invention.

However, due to assembling error, the position or the direction of the AF sensor 21 may deviate from the design position or the design direction. Consequently, the position of an image which should be positioned at the center of the visual field may be formed at a position displaced from the design center position of the pair of CCD line sensors 21c. This deviation causes parallax between the image on the focusing plate 14 and the image on the AF sensor 21. When the image of the aiming object is very thin and the focal position detecting portion is narrow, the image of the aiming object fails to coincide with the focus detecting portion under the effect of the displacement or parallax (as illustrated in FIGS. 7 and 9) resulting in an inability to focus.

Figure 3:
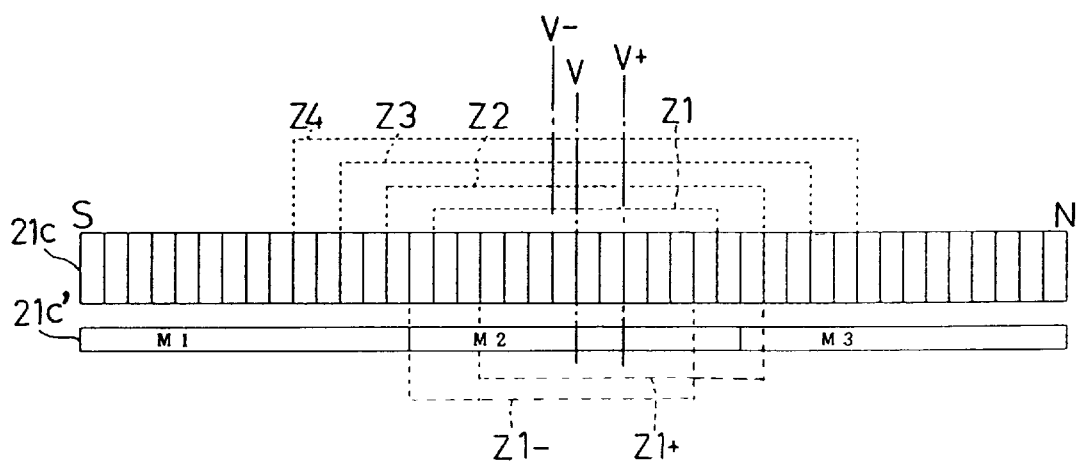
FIG. 3 is a schematic view of a reference CCD sensor of an AF sensor according to the present invention.

Therefore, in an embodiment of the present invention, the focus detecting portion can be adjusted by an assignment of a portion of pixels to the left or to the right. For example (as shown in FIG. 3), if the design center is a center line V, it is possible to assign (move) the focus detecting portion to a position at which the center line is V+, or to a position at which the center line is V−. The movement discussed herein does not relate to a movement of the CCD line sensor 21c itself, but to a assignment (re-assignment) of a portion of pixels (photometric transducers) used in the defocus amount calculation, in such a manner that, for example, the focus detecting portion Z1 is assigned to the focus detecting portion Z1+ or Z1−.

The assignment adjusting operation of the focus detecting portion is discussed below with reference to FIGS. 4–7. The operation is usually performed during a final adjustment of the assembly process of the auto-level 10, and the assignment data is stored in the EEPROM 6.

Figure 4:
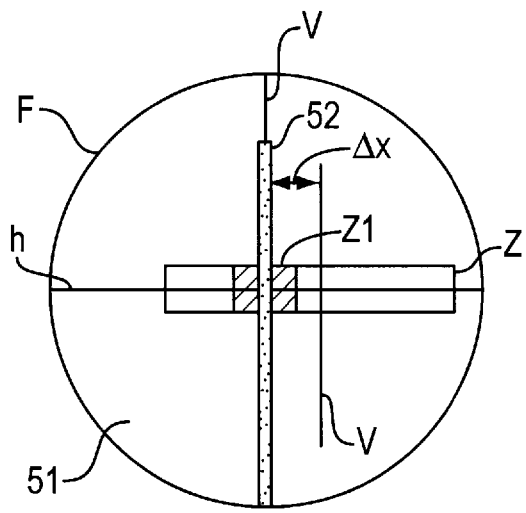
FIG. 4 is a schematic view of the relation of a focus detecting portion and a visual field after an adjustment of a focus detecting position of an auto-level according to the present invention.
Figure 5:
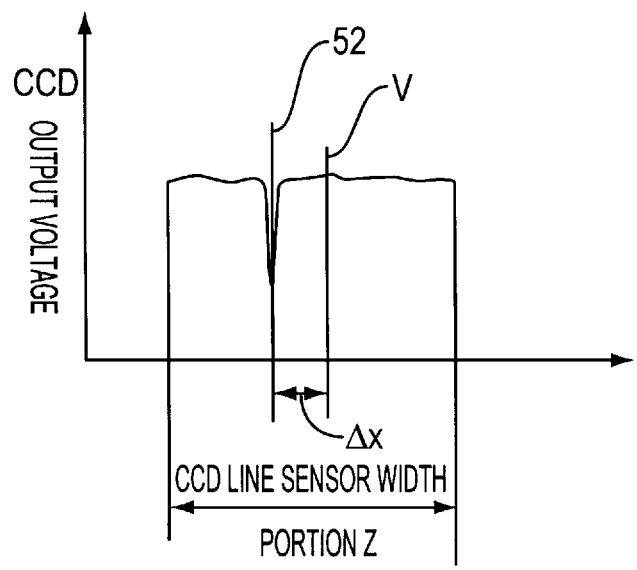
FIG. 5 is a graphic chart showing a distribution of an output signal level of a CCD line sensor during an adjustment of a focus detecting position of an auto-level according to the present invention.

In the adjusting operation, firstly the auto-level 10 is positioned on a substantially horizontal plane, and an intersection point of the reticle (cross hairs) in the visual field is made to coincide with the center of an optical axis of the telephotographic system. The telephotographic system is then directed to a chart plate 51 (FIG. 4). The chart plate 51 is a thin plate on which a vertical black line is drawn. The chart plate 51 is aimed at the auto-level 10 so that the vertical line 52 is perpendicular to the line sensor. The operator views through the telephotographic system so that the vertical line 52 coincides with the vertical line v of the reticle. The relation of the vertical line 52 of the chart plate 51 to the focus detecting portions Z and Z1 in the visual field F is illustrated in FIG. 4. FIG. 4 refers to the case when the center V of the focus detecting portion Z is diverted to the right by an amount Δ X in the visual field F.

The calculation/control circuit 23 is connected to a computer (personal computer) 60 (FIG. 1). The computer 60 has sets an AF sensor drive command, which is output to the calculation/control circuit 23 so that the AF sensor 21 executes the integration. The AF sensor data output from the AF sensor 21 is stored in the computer 60 via the calculation/control circuit 23. The AF sensor data in regard to all the pixels is displayed as a graphic chart on the display of the computer 60 (see FIG. 5). The vertical axis of the graphic chart represents the output voltage (integrated value) of each pixel of the CCD line sensor 21c, the horizontal axis therein represents the coordinates (positions) of the pixels. The portion indicated by the trough in the graphic chart represents the image of the vertical line 52, i.e., namely, the AF sensor data of pixels of the CCD line sensor 21c by which the image of the vertical line 52 is formed. The trough portion is displaced from the center of all the AF sensor data by an amount ΔX.

The computer 60 calculates the center of the image of the vertical line 52 and the divergence (displacement) amount ΔX from all the AF sensor data. The divergence amount ΔX (i.e., the center assignment amount) is stored in the EEPROM 6. The minimum unit of the center assignment amount in an embodiment of the present invention is the width of one pixel (photometric transducer) of the CCD line sensor 21c.

Figure 6:
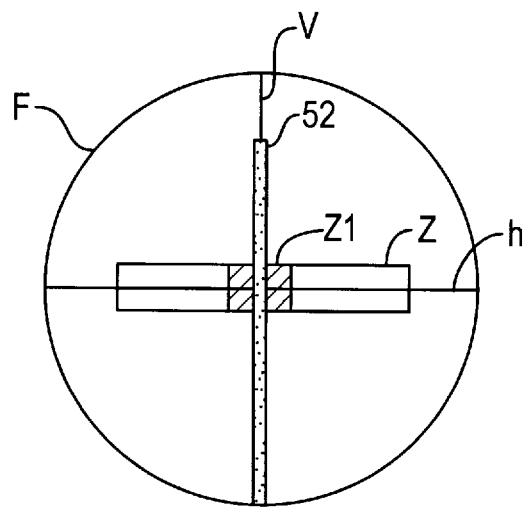
FIG. 6 is a schematic view of a visual field during an adjustment of a focus detecting position of an auto-level according to the present invention.

When the auto-level 10 is used in the field (i.e., after assembly, adjustment, and delivery to the customer), the calculation/control circuit 23 reads the assignment amount (ΔX) from the EEPROM 6 and adjusts the focus detecting portion during the AF operation, as discussed later in detail. FIG. 4 illustrates the relation of the focus detecting portions Z and Z1 to the visual field F after the adjustment thereof. FIG. 7 illustrates the relation of the focus detecting portions Z and Z1 to the visual field F before the adjustment thereof. FIG. 6 illustrates the relation of the focus detecting portions Z and Z1 when there is no divergence (i.e., no displacement or parallax).

The center position of the image of the chart plate 51 may be obtained by conventional methods, such as by calculating the center of gravity (centroid), or by setting the threshold level of the chart plate 51 at any value of density (brightness) in order to obtain the center position of the image from the intermediate point of the value representing the threshold level, etc.

The image of the chart plate 51 is formed on the respective CCD line sensors 21c of the AF sensor 21. When the image of the chart plate 51 is accurately focused, the image of the chart plate 51 is formed at an identical position on each of the respective CCD line sensors 21c. Consequently, it is sufficient to obtain an assignment value of only one of the CCD line sensors 21c in order to correct both.

A monitor sensor 21c'which controls the integration time (light receiving time) according to the brightness of the object image, is provided near (adjacent) the CCD line sensor 21c. The monitor sensor 21c'is provided with three monitor sensors M1, M2 and M3. The AF sensor 21 detects the output from the monitor sensors M1–M3, and controls the point in time at which integral operation of the CCD line sensor 21c is completed.

The AF sensor data output from the pair of CCD line sensor 21c, is amplified by a preamplifier 22 before being supplied to the calculation/control circuit 23. The calculation/control circuit 23 calculates the amount of defocus (defocus amount) in accordance with the AF sensor data. In the illustrated embodiment, in addition to the defocus amount, the displacement and direction of the movement of an AF motor 31 (the number of output pulses, referred to hereinafter as AF pulses of an encoder 33) necessary to move the focusing lens 12 until the defocus amount becomes zero is also calculated in accordance with the defocus amount.

The automatic focusing operation of the auto-level 10 is discussed below with reference to the flow charts shown in FIGS. 10 through 17. The automatic focusing operation is performed by the calculation/control circuit 23 when a battery (not shown) is loaded in the auto-level 10.

Upon loading of the battery, the internal RAM and input/output ports, etc., of the calculation control circuit 23 are initialized at step S101 to enter the power-down operation. Thereafter, the operation at step S101 is not performed unless the battery is unloaded and then reloaded.

The power-down operation corresponds to a stand-by operation in which the power source remains OFF while the AF start switch 27 is OFF. When the AF start switch 27 is turned ON, the power source is turned ON to perform the focusing operation.

In the power-down operation, a flag for the AF operation (focusing operation) is cleared (set to "0"), so that the operation ends (step S111). In the illustrated embodiment, there are several kinds of flags including: a focusing flag which represents that the focused state is obtained; an AFNG flag which represents that the automatic focusing operation cannot be carried out; a re-integration flag which represents that the integration operation is performed after the focused state has been obtained; a search/overlap flag which is adapted to indicate that the integral operation is performed during the movement of the focusing lens 12; a defocus OK flag which represents that the effective defocus amount is obtained; and a portion select flag which represents that the AF focus detecting portion is selected.

If the reset operation for the AF operation is completed, whether or not the AF start switch 27 is turned ON is checked (step S113). Since the AF start switch 27 is OFF at the initial position (i.e., the position in which the operator has not yet performed any operation) the AF start switch memory is OFF (OFF data is written) at steps S113 and S115. Thereafter, whether or not the power source is ON is checked at step S119. Since the power source is OFF at the initial position (in which no power is supplied to each circuit) the control is returned to step S113 and the operations at steps S113, S115 and S119 are repeated.

If the AF start switch 27 is turned ON, the control proceeds to step S117 to check whether the AF start switch memory is ON. As the AF start switch memory is OFF at first, control then proceeds to step S123 to turn the AF start switch memory ON (write ON data) at step S123. Thereafter, if the AF switch 29 is OFF, as in the manual focusing mode, control is returned to the power-down operation (steps S125, S111). If the AF switch 29 is turned ON, the power source is turned ON to supply power to the circuits in order to perform the VDD loop operation (steps S125, S127).

When control is returned to the power-down operation, the AF start switch memory is turned ON. Consequently, since the AF start switch 27 is ON, control proceeds from steps S111, S113, S117, and S119 to step S121, to stop the power supply and to then wait for the AF start switch 27 to be turned ON. If the AF start switch 27 is turned OFF, control proceeds to step S115 from step S113 to write OFF data in the AF start switch memory. Thereafter, control proceeds to step S121 from step S119, to stop the power supply and to then wait for the AF start switch 27 to be turned ON.

In the VDD loop operation, the focusing operation is carried out to obtain a focused state while detecting the state of the AF switch 29, and if focusing is not possible, the control is returned to the power-down operation.

When the control enters the VDD loop operation, the state of the AF switch 29 is again input (step S125). If the AF switch 29 is OFF (as in the manual focus mode) control is returned to the power-down operation (steps S201, S203) and the AF operation ends. In the following discussion, relating to the AF operation, it is assumed that the AF switch 29 is ON.

If the AF switch 29 is ON, the AF operation (focusing operation) is performed to detect the defocus amount and move the focusing lens 12 to a focal position in accordance with the defocus amount (step S205). During the AF operation, whether the AF start switch 29 is ON is periodically checked (step S207). At the first check, the AF start switch 27 is usually ON. Accordingly, whether or not the AF start switch memory 29 is ON is then checked. Since the AF start switch memory 29 has been turned ON at step S123, the focus flag and the AFNG flag are checked at steps S211, S213, and S215. Since the focus flag and the AFNG flag are both cleared either if no focused state was obtained or if the impossibility of the focusing operation was detected during the AF operation, the control is returned to step S201.

The operations at steps S201, S203, S205, S207, S211, S213, and S215 are repeated until the focus flag or the AFNG flag is set to "1". If the AF start switch 27 is OFF during such an operation, control proceeds to step S209 from step S207 to store the OFF data in the AF start switch memory, and is repeatedly returned to step S201 from step S215.

Normally, the focusing lens 12 is moved to the focal position during the AF operation at step S205. Consequently, the focus flag is set to "1" and control is returned from step S213 to the power-down operation in order to finish the AF operation. If focusing cannot be effected for some reason, such as when the aiming object moves, is too dark or is too low in contrast, the AFNG flag is set to "1" to return control to the power-down operation (S215), and thus the control ends (step S111).

When control is returned to the power-down operation, the AF start switch memory is turned ON as long as the AF start switch 27 is ON. Consequently, control proceeds from steps S113, S117, and S119 to step S121, to stop the power supply. If the AF start switch 27 is turned OFF, control proceeds to step S115 from step S113 to write OFF data in the AF start switch memory. Thereafter, control proceeds to step S121 from step S119, to stop the power supply and then to wait for the AF start switch 27 to be turned ON.

In any of the above cases, when control is returned to the power-down operation, the power supply is stopped, i.e., the power supply to the peripheral circuits other than the calculation/control circuit 23 is cut.

If the AF start switch 27 is turned ON again after it has been turned OFF during the VDD loop operation, the control proceeds to step S211 from step S207. Since the AF start switch memory is OFF at the first step, the control proceeds to step S217 from step S211 to store ON data in the AF start switch memory, and control returns to step S201.

If the AF start switch 27 is not turned ON during the AF start switch checking, whether or not the AF start switch memory is turned ON is checked. In this case, the AF start switch memory is ON, then the focusing flag check operation and the AFNG flag check operation are executed, and control is returned to step S201 (steps S209, S213, S215). If the AF start switch 27 is turned ON during the AF start switch checking, control proceeds to step S209 from S207 in order to store OFF in the AF start switch memory, and the focusing flag check operation and the AFNG flag operation are executed. Subsequently, control is returned to step S201 (steps S211, S213, S215).

As can be understood from the preceding text, once the AF start switch 27 is turned ON, the focusing operation is repeated until a focused state is obtained or until the impossibility of the focusing operation is detected. Thus, the user can execute the surveying operation without worrying about the focusing operation.

If the AF start switch 27 is turned ON during the VDD loop operation, in other words, if the manual focusing operation knob 16 is moved to the manual focus position, control is returned from step S203 to the power-down operation and the AF operation then ends.

A description of the AF operation from step S205 follows in detail with reference to the flow charts shown in FIGS. 12 through 17. When control enters the AF operation, the overlap flag, the search flag and the re-integration flag are checked (steps S301, S303, S305). Since all the flags have been cleared at step S111 at the first step, the AF sensor executes the integration and the result is input as AF sensor data to calculate the defocus amount (step S307). As is well known, in the calculation of the defocus amount, a correlation ratio of the data of a pair of AF sensors is obtained, so that the direction of defocus (front focus or rear focus) and the defocus amount can be obtained in accordance with the correlation ratio.

Whether or not the calculation result is effective is checked at step S309. If the contrast of the aiming object is too low, if the aiming object is a repetitive pattern, or if the object brightness is too low, there is a possibility that the calculation result will be ineffective. Normally, an effective calculation result is obtained, so the effective calculation result is discussed first.

If the calculation result is effective, the focus check operation is performed. If a focused state is obtained, the focus flag is set to "1", and if the telescope is out of focus, the focus flag is set to "0" (step S321). In the illustrated embodiment, when the defocus amount is within a predetermined limit or allowance, it is considered that a focused state is obtained. If the focused state is obtained, the control is returned to the VDD loop operation to perform the operations at step S207 and subsequent steps. In the case of an out-of-focus state, the control proceeds to the pulse calculation operation (step S323).

In the pulse calculation operation, the amount of drive of the AF motor 31 (the number of AF pulses supplied from the encoder 33) necessary to move the focusing lens 12 until the defocus amount is zero is calculated.

In the AF pulse calculation operation, the drive direction of the AF motor 31 and the number of AF pulses are calculated in accordance with the defocus amount (step S331). Subsequently, the AF pulse number is set in the AF pulse counter 23a, the AF motor 31 is DC-driven, and pulse checking is carried out (steps S333, S335). The value of the AF pulse counter 23a decreases by one every time one AF pulse is output from the encoder 33.

In the pulse check operation, the drive speed of the AF motor 31 is controlled in accordance with the value of the AF pulse counter 23a. The counted number is larger than an overlap integration prohibition pulse number. The AF motor 31 is driven at high speed to move the focusing lens 12 toward the focal position within a short space of time, and the overlap integration is effected. When the counted number is smaller than the overlap integration prohibition pulse number, the AF motor 31 is driven at high speed, but overlap integration is prohibited. If the counted number is smaller than a constant speed control start pulse number, the AF motor 31 is PWM (Pulse Width Modulation)-driven at low speed to prevent the focusing lens from moving to a hyperfocal distance of the telephotographic system. When the counted number is zero, the AF motor 31 is stopped.

When the control enters the pulse check operation, the value of the AF pulse counter 23a is compared with the overlap integration prohibition pulse number (step S341). If the counter value is larger than the overlap integration prohibition pulse number, the control proceeds to step S343 in which the overlap flag is set to "1". Thereafter, the overlap integration begins, and the AF sensor data is input from the AF sensor 21 to perform the defocus amount calculation (step S345). If an effective calculation result is obtained, control proceeds to the drive direction check operation, and if no effective calculation result is obtained, control is returned (step S347).

In the drive direction check operation, the AF pulse number is calculated and set in the counter, the AF pulse number being based on the AF sensor data obtained by the integration during driving of the AF motor 31. If the drive direction changes, the AF motor 31 is braked and stopped. In the illustrated embodiment, the AF motor 31 is braked by a short-circuit of the AF motor 31 at the opposite electrodes.

When the control enters the drive direction check operation, the overlap flag is set to "1", and the search flag is set to "0" (step S361). Thereafter, the previous and present drive directions of the focusing lens group 12 are compared in accordance with the calculation result (step S363). Normally, the directions are identical, and hence, the AF pulse number is calculated at an intermediate point of the integration, so that the calculated value is set in the counter (steps S363, S365). Subsequently control is returned.

If the drive direction changes, the AF motor 31 is braked and stopped. Consequently, the overlap flag is set to "0" and the re-integration flag is set to "1". Thereafter, control is returned to the VDD loop operation (steps S363, S367, S369, S371).

When control is returned to the VDD loop operation, the operations at step S207 and subsequent steps are carried out to enter the AF operation. If no change in the drive direction occurs, the control proceeds to the pulse check operation from step S301 (since the overlap flag is set to "1"). The operations from step S341 to S347 and the operations of the drive direction check operation from step S361 to S365 are carried out, and control is returned to the VDD loop operation for the pulse check operation. These operations are repeated until the counter value is smaller than the overlap integration prohibition pulse number.

In the aforementioned operations, usually the pulse number necessary to move the focusing lens to the focal position is decreased, and becomes smaller than the overlap integration prohibition pulse number. Thus, control proceeds from step S341 to S349 of the pulse check operation.

The operations from step S349 to S355 are effected to stop the AF motor 31 upon completion of the driving of the AF motor corresponding to the calculated pulse number. At step S349, control does not proceed until the AF pulse number is smaller than the constant speed control start pulse number. If the AF pulse number is smaller than the constant speed control start pulse number, the AF motor 31 is driven at low speed in accordance with the remaining pulse number. When the pulse number is zero, the AF motor 31 is stopped (step S349, S351, S353). When the AF motor 31 is stopped, the overlap flag is set to "0", and the re-integration flag is set to "1". Thereafter, control is returned to the VDD loop operation (steps S353, S355).

If control proceeds to step S205 of the VDD loop operation, control then enters the re-integration operation at step S305 (since the overlap flag and the search flag are set to "0" and the re-integration flag is set to "1"). The same is true when the drive direction changes at step S363.

In the re-integration operation, the defocus amount is calculated and whether or not the telescope is focused is checked in accordance with the defocus amount obtained. If the focused state is obtained, the focus flag is set to "1", and if the focused state is not obtained, the AF pulse is calculated again to move the focusing lens.

If control is returned to the VDD loop operation when the focus flag is set to "1", control proceeds to the power down operation from step S213. Thus, the AF operation ends and the control waits for the operation of the AF start switch 27.

The above discussion can be applied when the focused state is correctly obtained. In the case that it is difficult or impossible to obtain a focused state for some reason, control enters the VDD loop operation and is returned to the power-down operation, as discussed in the following text.

In the first AF operation, the integration begins, the AF sensor data is input, and the defocus amount is calculated at step S307 (steps S301, S303, S305). If it is impossible to calculate the effective defocus amount for some reason, i.e. when the object contrast is too low, the control proceeds to the search integration operation from step S309.

In the search integration operation, the integration and the defocus calculation are carried out to obtain an effective defocus amount while driving the AF motor 31 from a close focal position to an infinite focal position. If no effective defocus amount is obtained even by the search integration operation, the AFNG flag is set to "1" and control is returned and enters the power-down operation at step S215.

In the search integration operation, the AF motor 31 is search-driven (in the direction of the close focal position) and the search flag is set to "1" to commence the integration by the AF sensor 21. When the integration is completed, the integral value is input as the AF sensor data to calculate the defocus amount (steps S311, S313, S315). If the effective defocus amount is obtained, control proceeds to step S317 to the drive direction checking operation. If no effective defocus amount is obtained, the control is returned to the VDD loop operation to perform the operations at step S205 and subsequent steps (steps S317, S319).

The AF motor search-driving operation refers to an operation in which the AF motor 31 is first driven in the direction of the close focal position. When the focusing lens 12 reaches and stops at a movement extremity on the close distance side, the AF motor 31 is driven in the reverse direction, i.e., in the infinite focal position. When the focusing lens group 12 reaches and stops at a movement extremity on the infinite object distance side, the AF motor 31 is stopped. If an effective calculation result is obtained during the search driving, the AF motor is driven in accordance with the effective value of the defocus amount.

When control enters at step S205 of the VDD loop operation, the overlap flag is cleared. Since the search flag is set to "1", control enters the search integration operation at step S303 and the search integration operations at step S313, and subsequent steps are carried out. If no effective calculation result is obtained when the focusing lens group 12 reaches the infinite focal position, control enters the AFNG operation, in which the AFNG flag is set to "1". Thereafter, control is returned to the VDD loop operation and enters the power-down operation at step S215 (steps S317, S319, S391).

The preceding discussion has been based on the case when no effective calculation result is obtained from the beginning. Once an effective calculation result is obtained (so that the focusing lens 12 is moved but still no focused state is obtained), if no effective calculation result is obtained by the re-integration operation (steps S381, S383), control proceeds to the AFNG operation at step S385. The AFNG flag is set to "1" in the AFNG operation and thereafter, control is returned to the VDD loop operation and enters the power-down operation at step S215 (S385, S391).

Figure 15:
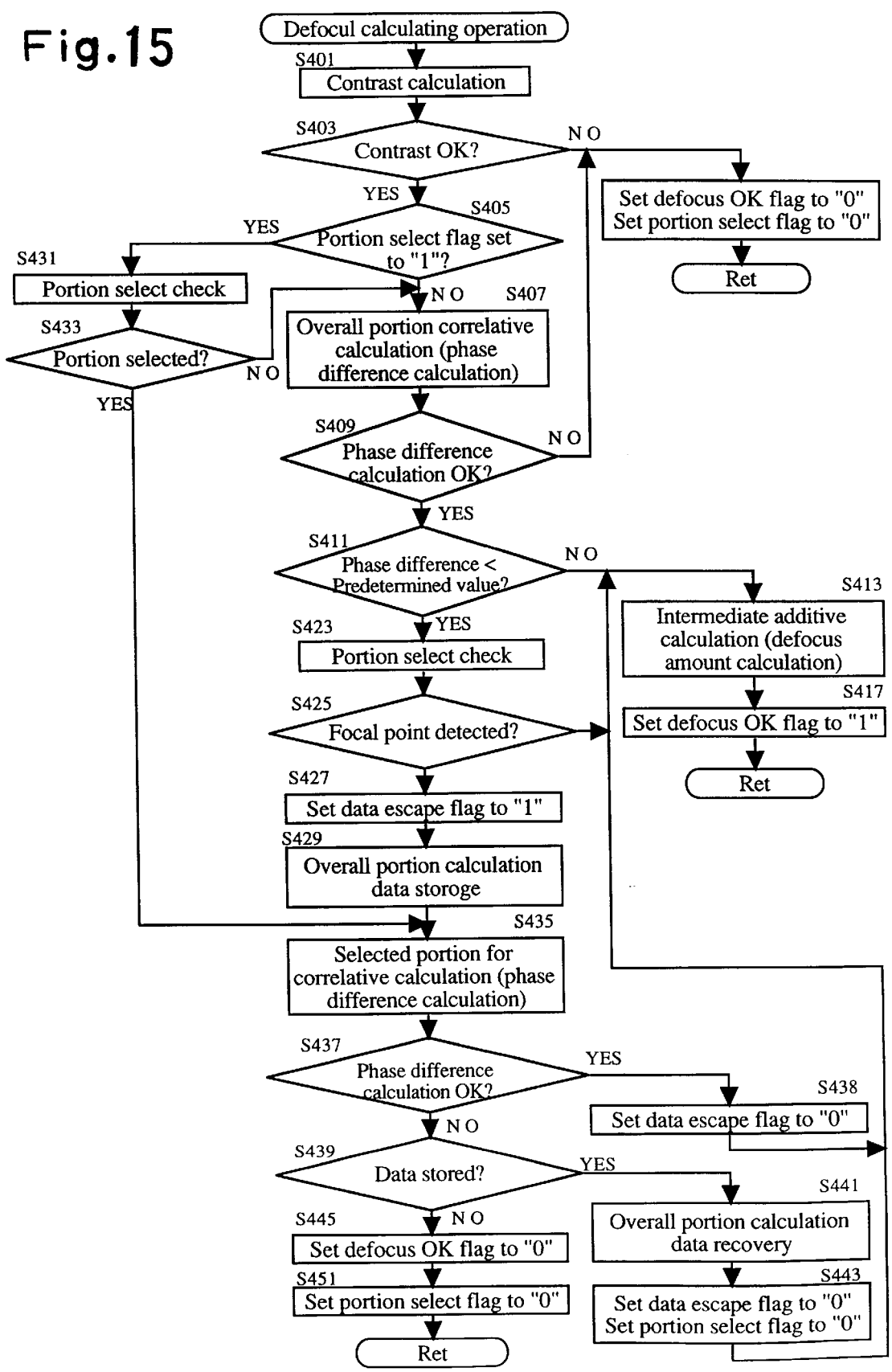
FIG. 15 is a flow chart showing a defocus calculating operation in an automatic focusing operation of an auto-level according to the present invention.

The details of the defocus operation are described with reference to FIG. 15, which is executed at steps S307, S315, S345 and S383. The defocus operation in the present embodiment first detects a contrast at the maximum focus detecting portion Z. When the effective contrast is not less than the predetermined value, the contrast is detected in order from the narrowest focus detecting portion Z1. If no effective contrast is obtained, the contrast is checked in the order of the focus detecting portions Z2, Z3 and Z4 until an effective contrast is obtained. Thereafter, the defocus amount is calculated by using the AF data in any of the focus detecting portions (in particular, the narrowest portion), and the focusing lens group 12 is driven in accordance with the obtained defocus amount. If no effective contrast is obtained in any of the selected focus detecting portions Z1 through Z4, the focusing is operated by using the AF data in the maximum focus detecting portion Z, a characteristic feature of the present invention.

When control enters the defocus operation, the contrast calculation is first executed based on the AF data from the maximum focus detecting portion Z (step S401). The contrast calculation utilizes, for example, the sum of the absolute value of the remainders of the integration value of the pixels (photoelectric transducers) adjacent to the used portion.

$$\sum_{n=s}^{N-1} |A_n - A_{n+1}|$$ (Formula 1)

In the formula shown above, "S" represents the bit number of the first pixel in the focus detecting portion, and "N" represents the bit number of the last pixel in the focus detecting portion.

As can be understood from the above formula, if the sum of the remainders of the integrated value is larger than the predetermined value, it is judged that sufficient contrast has been obtained. On the other hand, in the case that it is judged that no effective contrast has been obtained, the defocus OK flag and the portion select flag are respectively set to "0" and control returns (steps S403, 453).

The defocus OK flag represents whether or not an effective defocus is obtained, and the portion select flag represents whether or not the focal point detection portion is selected.

When an effective contrast of not less than the predetermined value is obtained, whether the portion select flag is set to "1" or not is checked. At the first operation, since the portion is not yet selected, the correlative calculation is executed by using the AF data obtained in the maximum focus detecting portion Z, and hence, the phase difference is calculated (steps S403, 405, 407). If no phase difference is calculated, the flag clearance operation is executed at step S453, and then the control returns (S409). If no focused position of the image formed on the pair of focus detecting portions Z is detected (such as when the image formed on the focus detecting portion Z is extremely out of focus), it is impossible to calculate the phase difference.

When an effective phase difference is obtained, whether or not the phase difference is less than the predetermined value (meaning whether or not the error in focus is small) is determined. When the phase difference is large (meaning when the error in focus is significant), the focus detecting portion is not selected, and control proceeds to the defocus calculation operations to calculate the defocus amount by the maximum focus detecting portion Z (steps S411, S413). The defocus OK flag is then set to "1" (S417).

When the phase difference is not less than the predetermined value, control repeats steps S401 through S411 and S413 through S417.

When the phase difference is less than the predetermined value, control proceeds to step S411 from S423 in order to execute the portion select check operation. The portion select check operation refers to the operation in which the contrast check is performed in the order from the narrowest focus detecting portion Z1 in order to select the first focus detecting portion in which a contrast not less than the predetermined value is obtained. In other words, in order to select the narrowest focus detecting portion in which a contrast not less than the predetermined value is obtained. When an effective contrast not less than the predetermined value is not obtained, selection of the focus detecting portion is not performed.

When control is returned from the portion select check operation, whether or not the focus detecting portion is selected is checked (S423, S425). If the focus detecting portion is not selected, control proceeds to step S413 (S425). If selected, the data storage flag is set to "1", so that the correlative calculation data (calculated data of the phase difference) of the maximum (overall) focus detecting portion is stored in the predetermined address of RAM (steps S425, S427, S429).

If an effective phase difference is obtained after executing the phase difference calculation in regard to the selected focus detecting portion, the data storage flag is set to "0", and control proceeds to the defocus calculation operation at step S413 (Steps S435, S437, S438, S413). If no effective phase difference is obtained, whether or not the data has been stored is additionally checked (Steps S437, S439). If the data have been stored, calculation data of each portion is read from RAM, and all the portions are selected as effective. Control then proceeds to the intermediate additive calculation operation after the data storage flag and the portion select flag are respectively set to "0" (steps S437, S439, S441, S443, S413). If the data have not been stored, the defocus OK flag is set to "0" and the portion select flag is set to "0" and control is returned (steps S439, S445, S451).

When control enters the defocus calculation operation after the portion select flag is set to "1" according to the selection of any of the focus detecting portions Z1 through Z4, control proceeds to step S431 from S405, so that the portion select check operation is executed. If none of the focus detecting portions are selected, control is returned to step S407 in order to use the maximum focus detecting portion Z (steps S433, S407). If any of the focus detecting portions is selected, control proceeds to step S435 so that the phase difference calculation is executed in regard to the selected portion (steps S433, S435).

The calculation of the phase difference of the selected portion is executed through steps S431, S433 and S435. After such an execution, if the effective phase difference is obtained, the data storage flag is set to "0", and control proceeds to the defocus calculation operation at step S413 (Steps S437, S438, S413). If no effective phase difference is obtained, since the calculation data of all the portions have not been stored, control proceeds to step S445 from S439 so that the defocus OK flag is set to "0", the portion select flag is set to "0" and control is returned (step S451).

In the aforementioned defocus calculation operation, the defocus amount is calculated based on the AF sensor data, in the narrowest focus detecting portion among the focus detecting portions in which the contrast not less than the predetermined value is obtained, and on condition that a contrast not less than the predetermined value is obtained in the overall portion.

Figure 16:
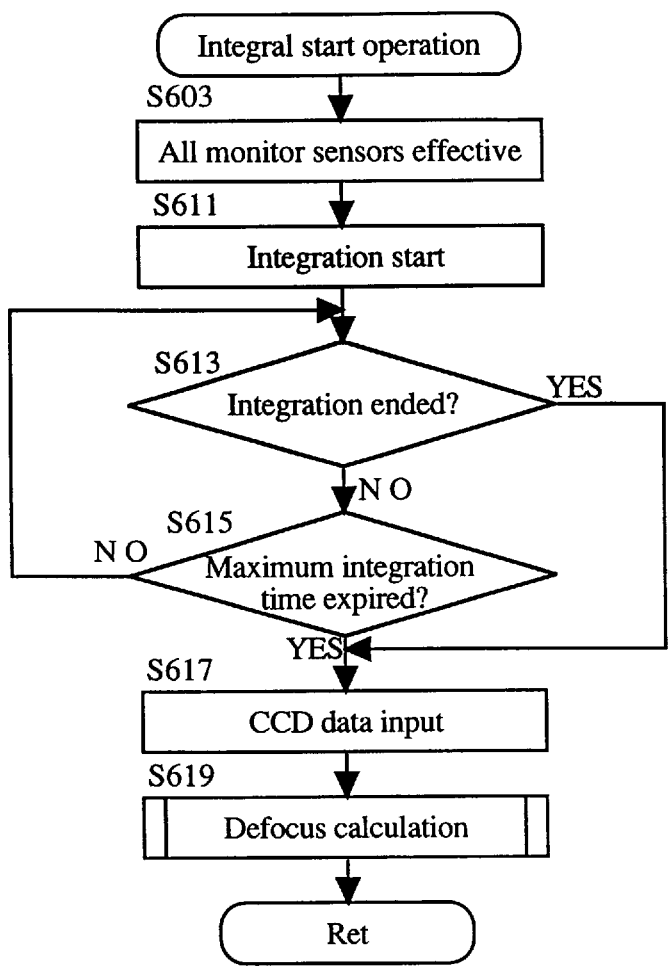
FIG. 16 is a flow chart showing an integral start operation in an automatic focusing operation of an auto-level according to the present invention; and, FIG. 17 is a flow chart showing a focus detecting portion select checking operation in an automatic focusing operation of an auto-level according to the present invention.

The integration start operation, which is executed at steps S307, S315, S345 and S383, is discussed in the following text with reference to the flow chart shown in FIG. 16.

When control enters the integration start operation, all the monitor sensors become effective and the integration is started (step S603, S611).

The integration ends when the output of the monitor sensor goes below the Automatic Gain Control (AGC) level, or when the maximum integration time expires. Then the CCD data (AF sensor data) is input, the defocus calculation is executed, and control is returned (steps S611, S613, S615, S617, S619).

Figure 17:
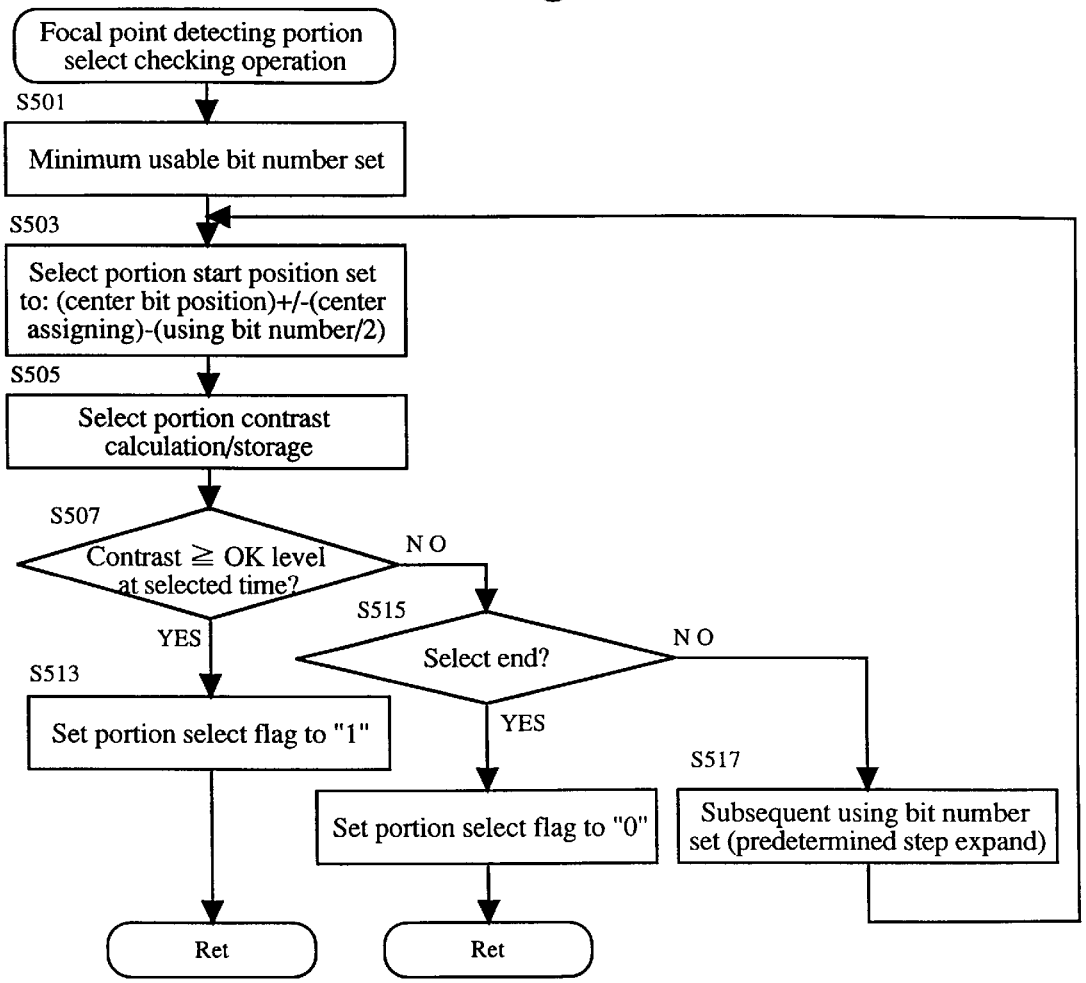

The portion select operation at steps S423 and S431 is discussed below with reference to the flow chart shown in FIG. 17. The portion select operation is performed by focusing in regard to the focus detecting portion selected as the narrowest focus detecting portion, among the focal portion detecting portions Z1 through Z4, which involve a contrast of not less than the second predetermined value. If no contrast not less than the second predetermined value is obtained among the focus detecting portions Z1 through Z4, focusing is performed using the maximum focus detecting portion Z.

When control enters the portion select operation, the smallest usable bit number, in other words, the number of pixels (photometric transducers or light receiving elements) corresponding to the minimum focus detecting portion is set at step S501. The start position of the select portion is then set at step S503. In such operations, the setting is performed in regard to the bit number of the pixels at the center of the focus detecting portions used for focal point detection, and in regard to the bit numbers S and N. The bit numbers S and N are positioned, when the aforementioned bit number is positioned at the center of the focus detecting portions, at each horizontal end of the aforementioned bit number.

According to an embodiment of the present invention, it is possible to adjust (assign) the center. When the center is adjusted, the bit number of the pixel at the center moves by an amount read from the EEPROM 6. Thus the center of the focus detecting portion coincides with the vertical line of the reticle (see FIG. 4).

The contrast calculation is executed based on formula 1 according to the AF sensor data of the focus detecting portion which is selected and assigned to the center. The result of the calculation is stored in then RAM at step S505.

Whether the calculated contrast is not less than the OK level at the selected time (i.e., the second predetermined value) is checked at step S507. If the calculated contrast is not less than the acceptable level, the portion select flag is set to "1", and control is returned (step S513).

In any case, when control is returned, the defocus amount is calculated based on the AF sensor data of the selected focus detecting portion, which actuates the focusing lens group 12 to be driven.

When the contrast is judged as being less than the OK level at the selected time, since it is impossible to obtain the accurate defocus amount in such a portion, the focus detecting portion expand operation is executed starting from step S515. Whether or not the selection ends, i.e., whether or not the contrast check is performed in regard to the focus detecting portion Z4, is checked at step S515. When the contrast check is performed in regard to the focus detecting portions Z1 through Z3, the usable bit number for the subsequent focus detecting portion is set. That is, the focus detecting portion in use is expanded by one portion. Control then returns to step S503 (steps S515, S517, S503). If the contrast of the expanded portion is not less than the OK level at the selected time, control proceeds to step S503 from S509. If the contrast of the expanded portion is less than the OK level at the selected time, control is returned to step S515 from S507.

When the contrast does not reach the OK level at the selected time (despite that the portion in use is expanded to the focus detecting portion Z4), the portion select flag is set to "0", and control is returned (steps S515, S519). In this case, the defocus amount is calculated by using the overall focus detecting portion Z.

Consequently, in an embodiment as illustrated, the center assignment amount of the focus detecting portion can be set to coincide with a portion symmetrical with respect to the reticle in the visual field. The center of the focus detecting portion discussed herein is therefore set without a mechanical movement of the AF sensor 21, but by an electrical or programmatic operation thereof.

In the aforementioned embodiment, the CCD line sensor 21c is used as the focus detecting means. Alternatively, it is possible to use an MOS type of line sensor.

Although the aforementioned embodiment is applied to an auto-level, the present invention can be equally applied to other surveying instruments, such as a transit, or a telescopic optical system such as a telescope or a binocular telescope, etc.

As may be understood from the preceding text, according to the present invention, a focus detecting device is provided which detects a focusing state of a telephotographic system based on the output from a line sensor which forms an image via the telephotographic system. An assigning device assigns the output portion of the line sensor used during the detecting of the focusing state. Therefore, it is possible to adjust the portion of the image of whose focal point is detected, without a mechanical movement of the line sensor or the focus detecting device, but by an electrical or programmatic operation.

What is claimed is:

1. A focus detecting apparatus, comprising:
   a line sensor having a physical center in a horizontal direction;
   a telephotographic system having a reference horizontal position, said telephotographic system forming an image onto said line sensor;
   a focus detecting device that detects a focus state of said telephotographic system based on an output from a predetermined portion of said line sensor; and
   an assigning device that assigns which pixels are to be used as said predetermined portion for detecting a focusing state when the physical center of the line sensor deviates in the horizontal direction from the reference horizontal position of the telephotographic system.

2. A focus detecting apparatus, comprising:
   a line sensor having a physical center in a horizontal direction;
   a telephotographic system having a reference horizontal position, said telephotographic system forming an image onto said line sensor;
   a focus detecting device that detects a focus state of said telephotographic system based on an output from a predetermined portion of said line sensor; and
   an assigning device that assigns which pixels are to be used as said predetermined portion for detecting a focusing state where the physical center of the line sensor deviates in the horizontal direction from the reference horizontal position of the telephotographic system.

3. A focus detecting apparatus according to claim 2, further comprising a calculation device that calculates a defocus amount based on an output of a focus detecting portion of said line sensor.

4. A focus detecting apparatus according to claim 3, wherein said assigning device assigns said focus detecting portion so that a center of an image formed on said focus detecting portion corresponds to an image formed on a focusing plate with a reticle designated as a center of the focusing plate.

5. A focus detecting apparatus according to claim 4, incorporated in a surveying instrument.

6. A focus detecting apparatus according to claim 5, said telephotographic system further comprising:

an objective lens group;

a focusing lens group that adjusts the focus state by moving along an optical axis of said telephotographic system;

a focusing plate to which said reticle is provided;

an eyepiece lens group for observing an object image formed on said focusing plate; and a beam splitter optical system positioned between said focusing lens group and said focusing plate, wherein said line sensor comprises a plurality of light receiving devices positioned horizontally along a light path split by said beam splitter optical system, and having said reticle as a center of said plurality of light receiving devices.

7. A focus detecting apparatus according to claim 6, further comprising a memory device that stores assigning data of an area of said output of the line sensor used during a detection of said focusing state of said telephotographic system.

8. A focus detecting apparatus according to claim 7, wherein when said focus detecting device detects a focus state, said assigning data are read from said memory device.

9. A focus detecting apparatus of a surveying instrument, comprising:

a telephotographic optical system including an objective lens group, a focusing lens group, a focusing plate having a reticle, and an eyepiece lens group for observing an image formed on said focusing plate;

a beam splitting optical system positioned between said focusing lens group and said focusing plate for splitting an image of said telephotographic system along two optical paths;

a light receiving device, said reticle being near the horizontal center of the light receiving device and positioned to span each of the two optical paths, said light receiving device having a focus detecting portion on which an image corresponding to the image formed on said focusing plate;

a calculating device for calculating a defocus amount in accordance with phase difference values detected by said light receiving device; and a shifting device for shifting the portion of said light receiving portion defined as said focus detecting portion within said line sensor so that the center of said focus detecting portion aligns with said reticle.

10. A focus detecting apparatus of a surveying instrument, comprising:

a telephotographic optical system;

a focusing device including a focus plate having a reticle, and a line sensor having a focus detecting portion, said focusing device being arranged to form an optical image, transmitted through said telephotographic optical system, on said focus detecting portion;

a shifting means for shifting said focus detecting portion within said line sensor so that the center of said focus detecting portion aligns with said reticle.

11. A focus detecting apparatus, comprising:

a line sensor extending in a horizontal direction;

a telephotographic system that forms an image on said line sensor, said telephotographic system having a horizontal center along said horizontal direction;

an assigning system for setting a virtual center of said line sensor, said virtual center being defined by a set of pixels bracketing said horizontal center of said telephotographic system, said virtual center of said line sensor differing from an actual center of said line sensor by the displacement of the physical center of said line sensor in said horizontal direction from said horizontal center of said telephotographic system; and a focus detecting device that detects a focus state of said telephotographic system based on an output from pixels of said line sensor bracketing the virtual center.

* * * * *